L. NEUENSCHWANDER.
ELECTRIC FRUIT MARKING MACHINE.
APPLICATION FILED JUNE 3, 1919.

1,421,539.

Patented July 4, 1922.
2 SHEETS—SHEET 1.

WITNESS
C. S. Evans

INVENTOR
Lewis Neuenschwander
BY
White & Prost
his ATTORNEYS

L. NEUENSCHWANDER.
ELECTRIC FRUIT MARKING MACHINE.
APPLICATION FILED JUNE 3, 1919.
1,421,539.
Patented July 4, 1922.
2 SHEETS—SHEET 2.
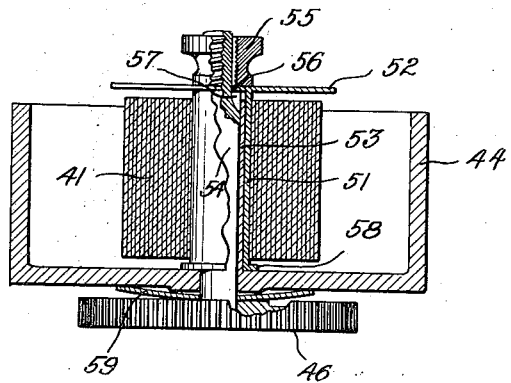
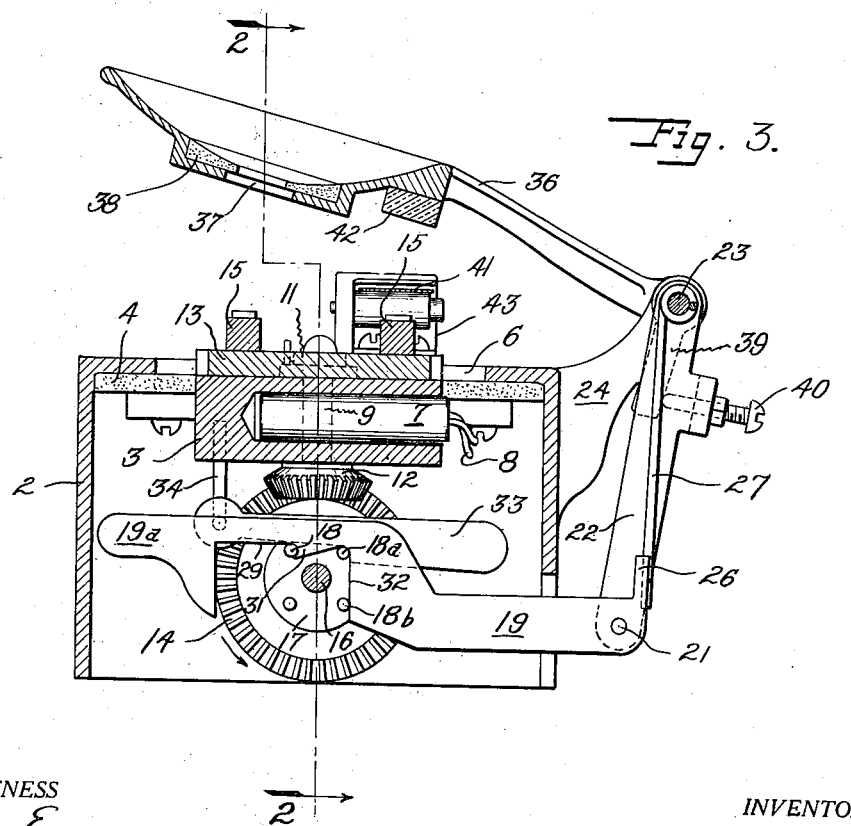
WITNESS
G. S. Evans
INVENTOR
Lewis Neuenschwander
BY
White & Prost
his ATTORNEYS

UNITED STATES PATENT OFFICE.

LEWIS NEUENSCHWANDER, OF LOS ANGELES, CALIFORNIA, ASSIGNOR TO ELECTRIC FRUIT MARKING CO., OF SAN FRANCISCO, CALIFORNIA, A CORPORATION OF CALIFORNIA.

ELECTRIC FRUIT-MARKING MACHINE.

1,421,539.  Specification of Letters Patent.  Patented July 4, 1922.

Application filed June 3, 1919. Serial No. 301,531.

*To all whom it may concern:*

Be it known that I, LEWIS NEUENSCHWANDER, a citizen of the United States, and a resident of Los Angeles, county of Los Angeles, and State of California, have invented a new and useful Electric Fruit-Marking Machine, of which the following is a specification.

My invention relates to apparatus for marking or branding fruit.

An object of the invention is to provide a manually operated fruit marking apparatus.

Another object of the invention is to provide an apparatus with which pieces of fruit held in the hand of the operator may be placed in proper marking position upon hot freshly inked dies.

The invention possesses other features of advantage, some of which, with the foregoing, will be set forth in the following description of the preferred form of my invention which is illustrated in the drawings accompanying and forming part of the specification. It it to be understood that I do not limit myself to the showing made by the said drawings and description, as I may adopt variations of the preferred form within the scope of my invention as set forth in the claims.

Referring to the drawings:

Figure 3 is a vertical sectional view of the machine. The plane of section is indicated by the line 3—3 of Fig. 2.

Figure 4 is a horizontal sectional view through the ribbon reel at the right of Fig. 1.

Figure 1:
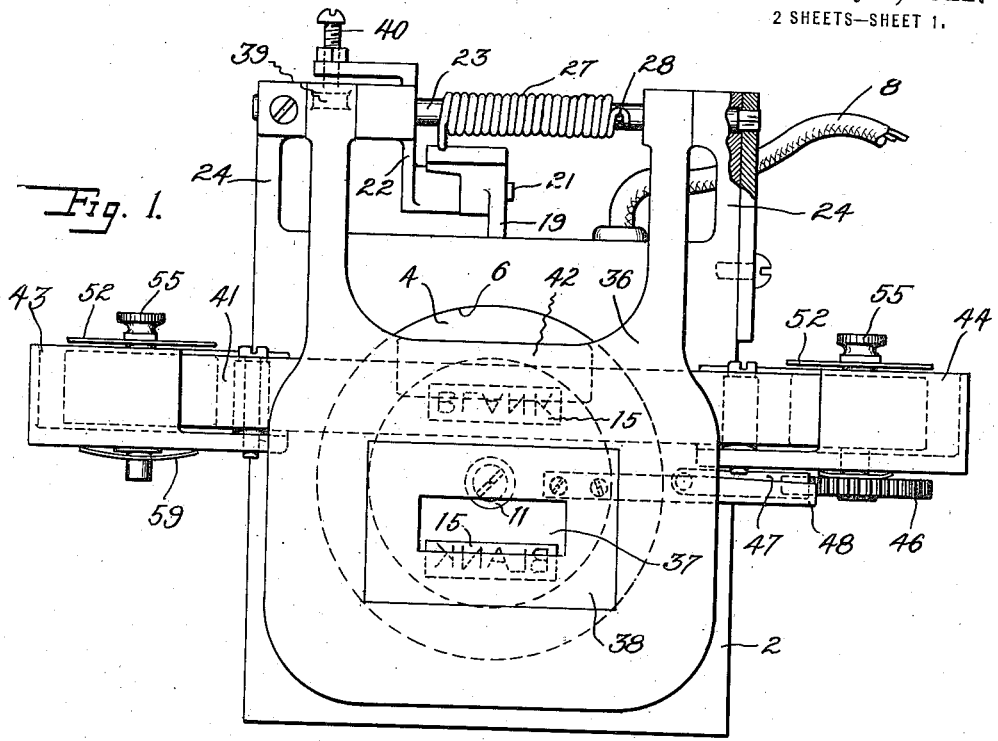
Figure 1 is a plan view of the marking machine of my invention.

In general terms my invention comprises a plurality of dies; a depressible arm being arranged over the dies and provided with means for positioning thereon fruit to be marked, so that the operator may place the fruit upon the arm and by pressing downwardly and giving the fruit a slight rolling movement, bring the fruit into proper contact with a die. Means operated by the depressible arm bring the dies successively into marking position. Means are also provided for heating the dies and freshly inking each die before contact with the fruit.

The machine comprises a rectangular box or housing 2, in the top of which a block 3 of aluminum or other material of high heat conductivity is secured. A layer 4 of heat insulating material is interposed between the block and the housing top, and the top is recessed at 6 about the block so as to prevent the conduction of heat from the block to the housing. A heating coil 7 is arranged in the block and connected by conductors 8 to any suitable source of current.

Rotatably mounted in the block 3 is a shaft 9 provided with a head 11 on top of the block, and a bevel gear 12 below the block. A disk 13 is detachably seated upon the head 11 and rotates with the shaft 9. A plurality of dies 15 (in the present instance two dies are used) are mounted on the disk 13.

Meshing with the gear 12 is a gear 14 fixed on the shaft 16 which is rotatably mounted in suitable bearings in the sides of the housing 2. A hub or plate 17 integral with or attached to the gear 14 is provided with preferably four studs 18, and resting upon the studs is a pawl 19, the function of which is to turn the plate to effect the rotation of the gears 14 and 12 and die disk 13. The pawl is pivoted by the pin 21 to a lever arm 22 pivotally mounted on a shaft 23 held in arms 24 fixed to the housing, and is adapted to be reciprocated by the lever. The end of the pawl adjacent the pin 21 is provided with an upwardly extending lip 26, and a spring 27 coiled about and fixed to the shaft 23 by the pin 28 extends downwardly into contact with the lip. The spring thus performs two functions in respect of the pawl. It tends to retain it in the forward position shown in Fig. 3 and at the same time tends, by its pressure on the lip, to prevent the pawl from rising out of contact with the studs. The weight of the extended portion 19ª of the pawl also tends to retain the pawl against the studs.

The lower edge 29 of the pawl which rests upon the studs is provided with a tooth 31 adapted to catch a stud on the forward or advancing movement of the pawl, but to ride over the following stud 18ª on the recovery movement. The shape of the pawl is such as to provide an edge 32 perpendicular to the edge 29 and adapted to act as a stop against which the next following stud 18ᵇ impinges when the pawl has reached the end of its advance stroke. In order to prevent a reverse motion of the plate 17 and gear 14, a gravitally operated latch 33, resting upon the studs, is pivotally attached to the bracket 34. Thus the function of the pawl is to impart a definite limited rotary motion to the plate 17, and through the mediate connections, to the die disk 13, and at the end of this movement to hold the plate and consequently the die disk stationary.

Preferably two dies are mounted diametrically across from each other upon the die disk, and the operating mechanism is such that the die disk is given one-half of a complete revolution with each advance movement of the pawl 19, thus moving the dies alternately into and out of the marking position.

Figure 2:
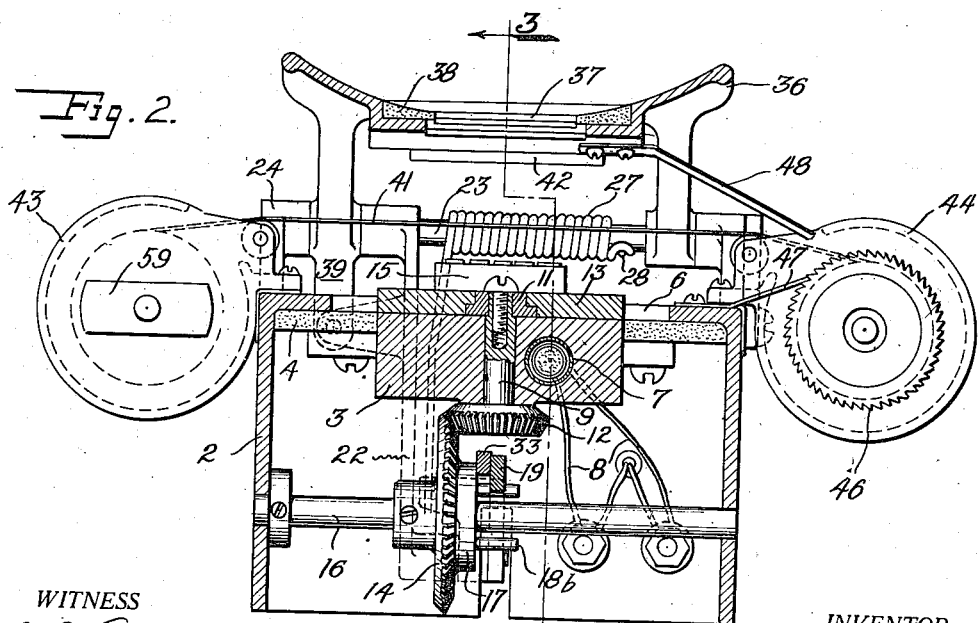
Figure 2 is a vertical sectional view of the machine. The plane of section is indicated by the line 2—2 of Fig. 3.

In the stationary position of the die disk, one of the dies is in the marking position, and means are provided for enabling the operator to accurately bring pieces of fruit to be marked down upon the die. An arm 36 pivotally mounted upon the pivot rod 23, is provided with an elongated saucer-like depression, best shown in Figures 2 and 3. An aperture 37, preferably surrounded by a cork pad 38, is formed in the bottom of the depression, and the parts are proportioned so that when the arm is depressed the aperture therein registers with the die occupying the marking position and fruit held in the depression of the arm is marked by the die. The arm 36 is provided with a downward extension 39 adapted to engage and operate the lever 22, and is adjustable therewith by means of the set screw 40, so that by varying the position of the arm 36 relative to the arm 22, the extent of the recovery movement of the pawl may be regulated.

While one of the dies is in the marking position, means are provided for inking the other die. An inking ribbon 41 extends across the top of the housing in such position that the dies rotate thereunder and come to rest below the ribbon, and below a pad 42 fixed on the under side of the arm. When the arm is depressed the pad presses the ribbon, which normally is out of direct contact with the die, into contact therewith. The ribbon is wound upon reels rotatably mounted in casings 43 and 44 fixed, one at each side of the housing 2. One of the reels which is shown in section in Figure 4 is provided with a ratchet wheel 46, prevented from turning in one direction by a spring 47 pivotally fixed on the housing and engaging the teeth of the ratchet. A spring 48 fixed on the depressible arm is adapted to engage the ratchet and rotate it a small amount on each depression of the arm so as to feed the ribbon gradually across the dies. The ribbon is wound upon a sleeve 51 formed with a retaining and protective flange 52. The sleeve is adapted to fit over and rotate upon the hollow stud 53 formed on the casing. The shaft 54 carrying the ratchet 46 forms a running fit on the interior of the stud. A thumb nut 55 threaded on the opposite end of the shaft holds the parts together, and a tooth 56 on the flange engaging a slot 57 in the threaded end of the shaft prevents relative rotative movement between shaft and sleeve so that the two turn together. The inner end of the sleeve is provided with a flange 58 which forms an end bearing for both shaft 54 and sleeve, and a spring 59 interposed between the shaft and the casing retains the flange 58 against the wall of the casing and at the same time prevents momental movement of the reel. The other reel in the casing 43 is of similar structure except that no ratchet is needed or provided. When the ribbon has all been wound upon the right hand reel, Figure 1, just described in detail, the spring 47 is swung out of engagement with the ratchet and the ribbon turned back upon the other reel by manual manipulation.

After turning on the current to heat the dies and proper adjustment of parts, the machine is used as follows. Pieces of fruit to be marked are grasped by the operator and the arm 36 depressed by pressing the fruit downwardly in the saucer-like portion until the fruit contacts with the die, when if needed, as in the case of a relatively long die, it may be given a slight rolling motion to bring it firmly against all portions of the die. With the release of the fruit, the arm rises to the position shown in Figure 3, by reason of the spring 27, the pawl 19 simultaneously advancing to turn the die disk one-half way around. This places a new and freshly inked die in marking position under the aperture in the arm and moves the die just used around under the ribbon where it is inked upon the next depression of the arm.

I claim:

1. A fruit marking machine comprising a disk, means for mounting the disk for rotation in a fixed plane and about a fixed axis, dies on said disk, a movably mounted arm arranged adjacent the disk, and means operated by said arm for rotating said disk to place one of said dies in marking position.

2. A fruit marking machine comprising a rotatable disk, dies on said disk, means for heating said dies, a manually operable arm movably mounted adjacent the disk, means on the arm for positioning fruit held thereon, and means operated by said arm for rotating said disk to place one of said dies below the fruit on said arm.

3. A fruit marking machine comprising a rotatable disk, dies on said disk, means for heating said dies, a manually operable arm movably mounted adjacent the disk, said arm being provided with a depression for positioning fruit held thereon and an aperture within the depression, and means operated by said arm for rotating said disk to place one of said dies below said aperture.

4. A fruit marking machine comprising a rotatable disk, dies on said disk, a movably mounted arm arranged adjacent the disk, means on said arm for positioning the fruit to be marked, means operatively connected to said arm for rotating the disk to place one of said dies in marking position, a block disposed below said disk for heating the dies, and means for heating said block.

5. A fruit marking machine comprising a rotatable disk, a pair of dies on said disk, an arm pivoted adjacent the disk, means on said arm for positioning thereon the fruit to be marked, die inking means, and means operatively connected to said arm for rotating the disk to place one of said dies in marking position, and the other of said dies against the inking means.

6. In a fruit marking machine, a block of heat conducting material, means for heating said block, dies arranged adjacent said block to be heated thereby, a movable arm arranged adjacent the dies, means on said arm for positioning thereon the fruit to be marked whereby said fruit is brought into contact with one of said dies when the arm is moved, and means automatically operated during the recovery of said arm for moving said dies successively into marking position.

7. In a fruit marking machine, a block of heat conducting material, means for heating said block, dies arranged adjacent said block to be heated thereby, a movable arm arranged adjacent the dies, means on said arm for positioning thereon the fruit to be marked whereby said fruit is brought into contact with one of said dies when the arm is moved, means automatically operated during the recovery of said arm for moving said dies successively into marking position, and means for automatically inking said dies.

8. In a fruit marking machine, a block of heat conducting material, means for heating said block, dies arranged adjacent said block to be heated thereby, a movable arm arranged adjacent the dies, means on said arm for positioning thereon the fruit to be marked whereby said fruit is brought into contact with one of said dies when the arm is moved, means automatically operated during the recovery of said arm for moving said dies successively into marking position, an inking ribbon engaged by each die before reaching marking position, and means operated by said arm for advancing said ribbon.

9. A fruit marking machine comprising a rotatable disk, dies on said disk, a pivotally mounted arm arranged above the dies, means on said arm for positioning thereon the fruit to be marked, means for rotating the disk to move the dies successively into operating position during the recovery movement of the depressible arm, and a spring for effecting said recovery movement and actuating said disk rotating means.

10. In a fruit marking machine a block of material possessing a high degree of heat conductivity, a disk of similar material rotatably mounted on said block, electric means for heating the block, dies arranged on said disk, a depressible arm arranged above the dies, means on said arm for positioning thereon the fruit to be marked whereby said fruit is brought in contact with one of said dies when said arm is depressed, and means automatically operating during the recovery movement of said arm for moving said dies successively into marking position.

11. A fruit marking machine comprising a plurality of dies, a depressible arm arranged above the dies, means on said arm for positioning thereon the fruit to be marked whereby said fruit is brought in contact with one of said dies when said arm is depressed, means automatically operating during the recovery movement of said arm for moving said dies successively into marking position, an inking ribbon engaged by each die before reaching marking position, and means operated by said arm for advancing said ribbon.

12. A fruit marking machine comprising a die, a depressible arm arranged above the die, means on said arm for positioning thereon the fruit to be marked whereby said fruit is brought in contact with said die when said arm is depressed, and means for varying the movement of said arm relative to the face of said dies.

13. In a fruit marking machine a rotatable disk, dies arranged on said disk, a depressible arm arranged above the dies, means on said arm for positioning thereon the fruit to be marked whereby said fruit is brought in contact with one of said dies when said arm is depressed, a rotatable plate connected for rotation with said disk, studs on said plate, and a pawl mediately connected to said depressible arm and arranged for cooperation with said plate whereby the pawl in advancing engages one of the studs to rotate the plate and successively engages another of the studs to limit said rotation.

14. In a fruit marking machine a rotatable disk, dies arranged on said disk, a depressible arm arranged above the dies, means on said arm for positioning thereon the fruit to be marked whereby said fruit is brought in contact with one of said dies when said arm is depressed, a rotatable plate connected for rotation with said disk, studs on said plate, a pawl mediately connected to said depressible arm and arranged for cooperation with said plate whereby the pawl in advancing engages one of the studs to rotate the plate and successively engages another of the studs to limit said rotation and a latch for preventing a reverse movement of said plate during the recovery movement of said pawl.

15. In a fruit marking machine, a rotatable disk, dies arranged on said disk, a depressible arm arranged above the dies, means on said arm for positioning thereon the fruit to be marked whereby said fruit is brought in contact with one of said dies when said arm is depressed, a rotatable plate connected for rotation with said disk, studs on said plate, a pawl arranged for co-operation with said plate whereby the pawl in advancing engages one of the studs to rotate the plate and successively engages another of the studs to limit said rotation, a latch for preventing a reverse movement of said plate during the recovery movement of said pawl, means connecting the depressible arm and the pawl whereby depression of the former effects the recovery of the latter, and a spring for effecting the recovery of said depressible arm and the advancement of the pawl.

In testimony whereof, I have hereunto set my hand at Pandora, Ohio, this 16 day of May, 1919.

LEWIS NEUENSCHWANDER.

In presence of—
M. E. KROHM,
A. R. HANCOCK.